Aug. 10, 1937.  H. E. ROCKEFELLER  2,089,840
WELDING MACHINE
Filed April 26, 1933  7 Sheets-Sheet 1

INVENTOR
HARRY E. ROCKEFELLER
ATTORNEY

Aug. 10, 1937.   H. E. ROCKEFELLER   2,089,840
WELDING MACHINE
Filed April 26, 1933   7 Sheets-Sheet 2

INVENTOR
HARRY E. ROCKEFELLER
BY
ER Treenewald
ATTORNEY

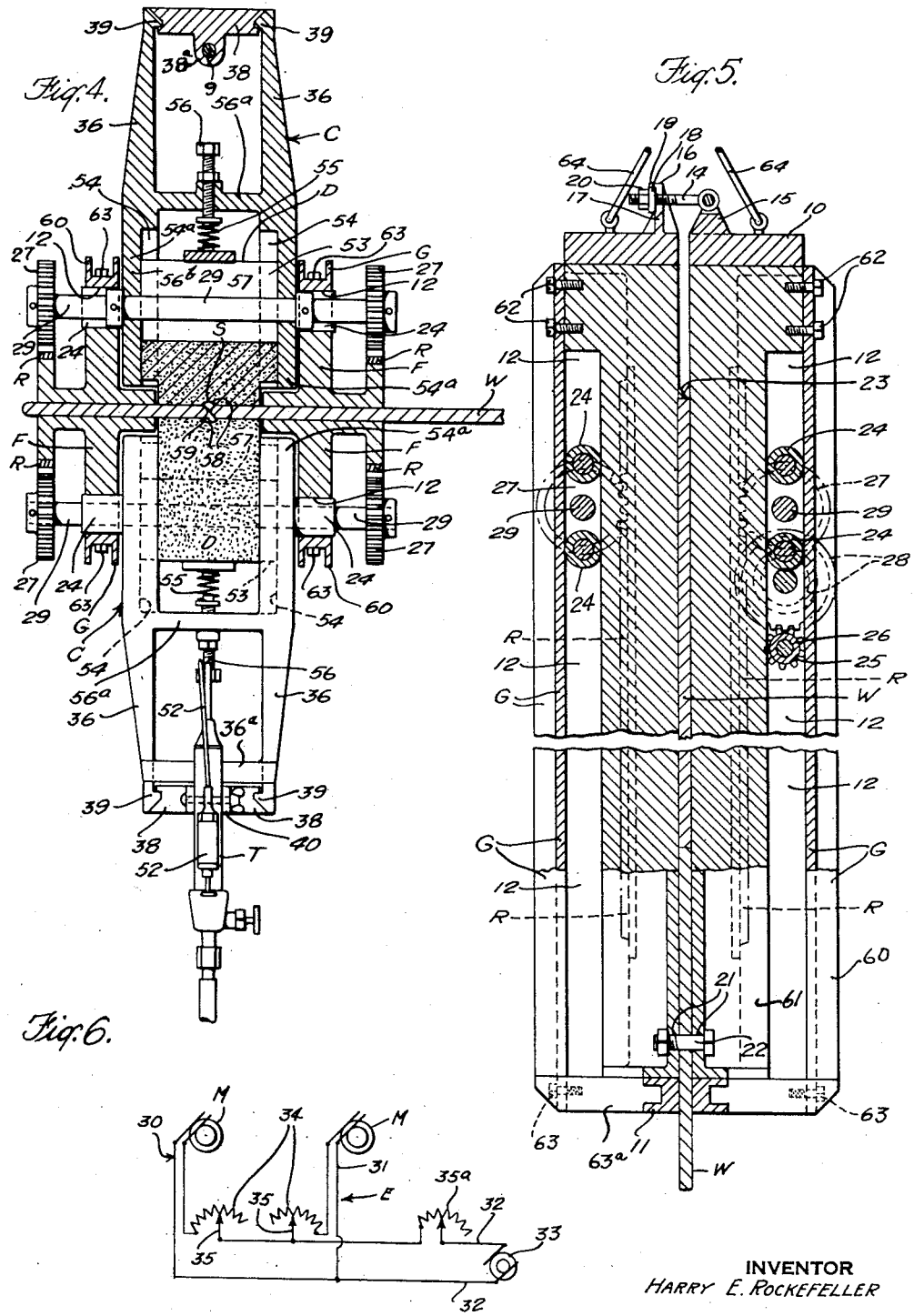

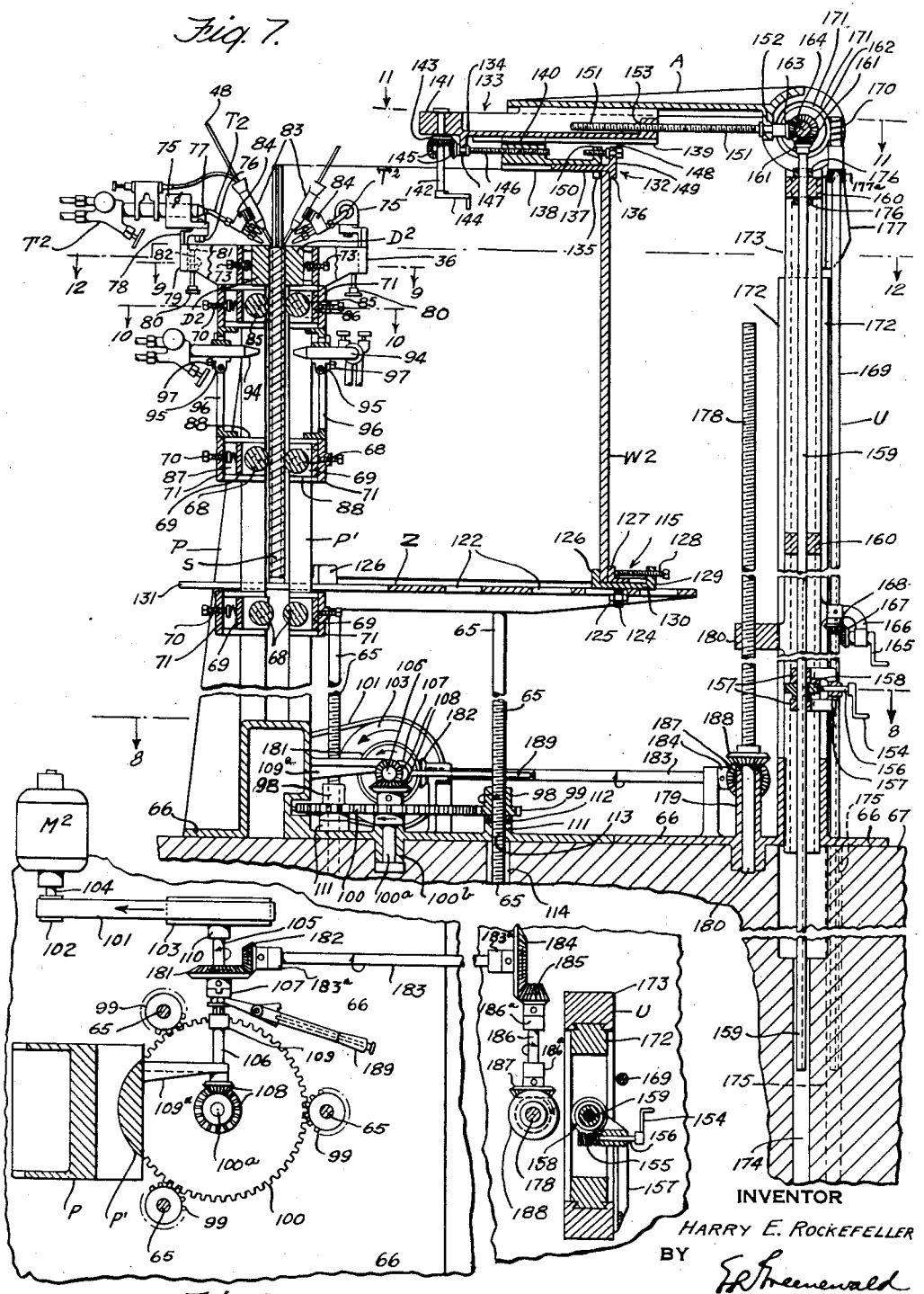

Aug. 10, 1937.  H. E. ROCKEFELLER  2,089,840
WELDING MACHINE
Filed April 26, 1933   7 Sheets-Sheet 5
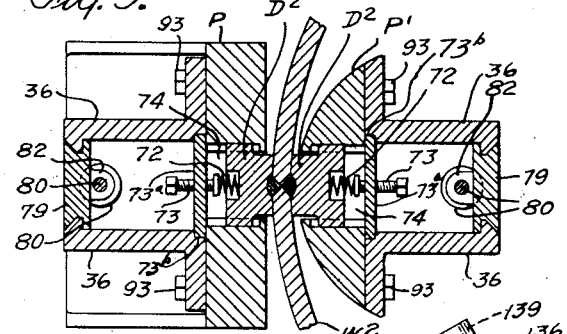
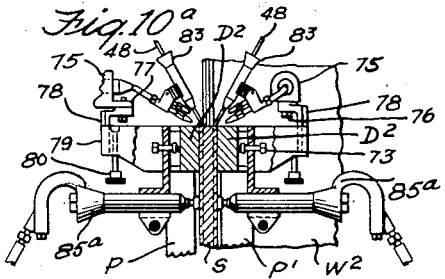
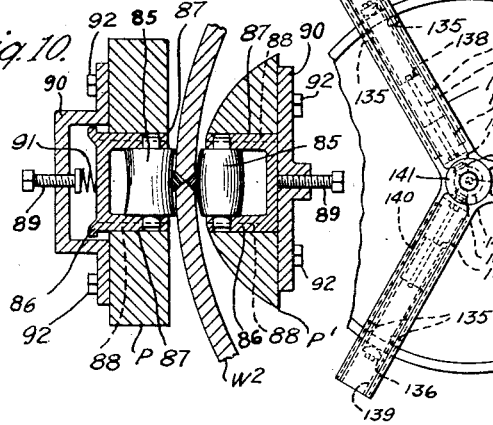
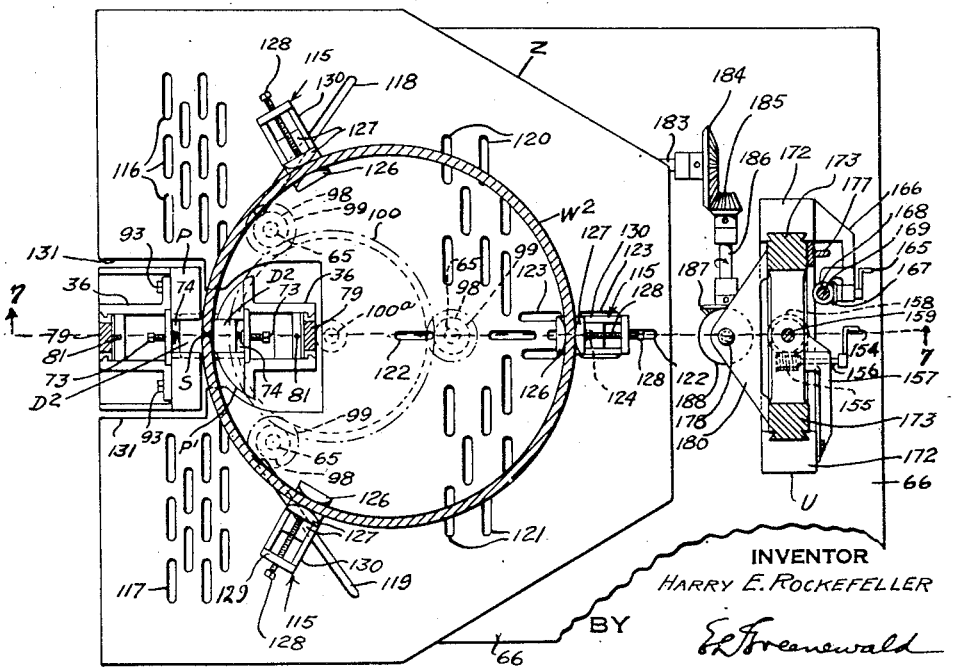
INVENTOR
HARRY E. ROCKEFELLER
BY
ATTORNEY

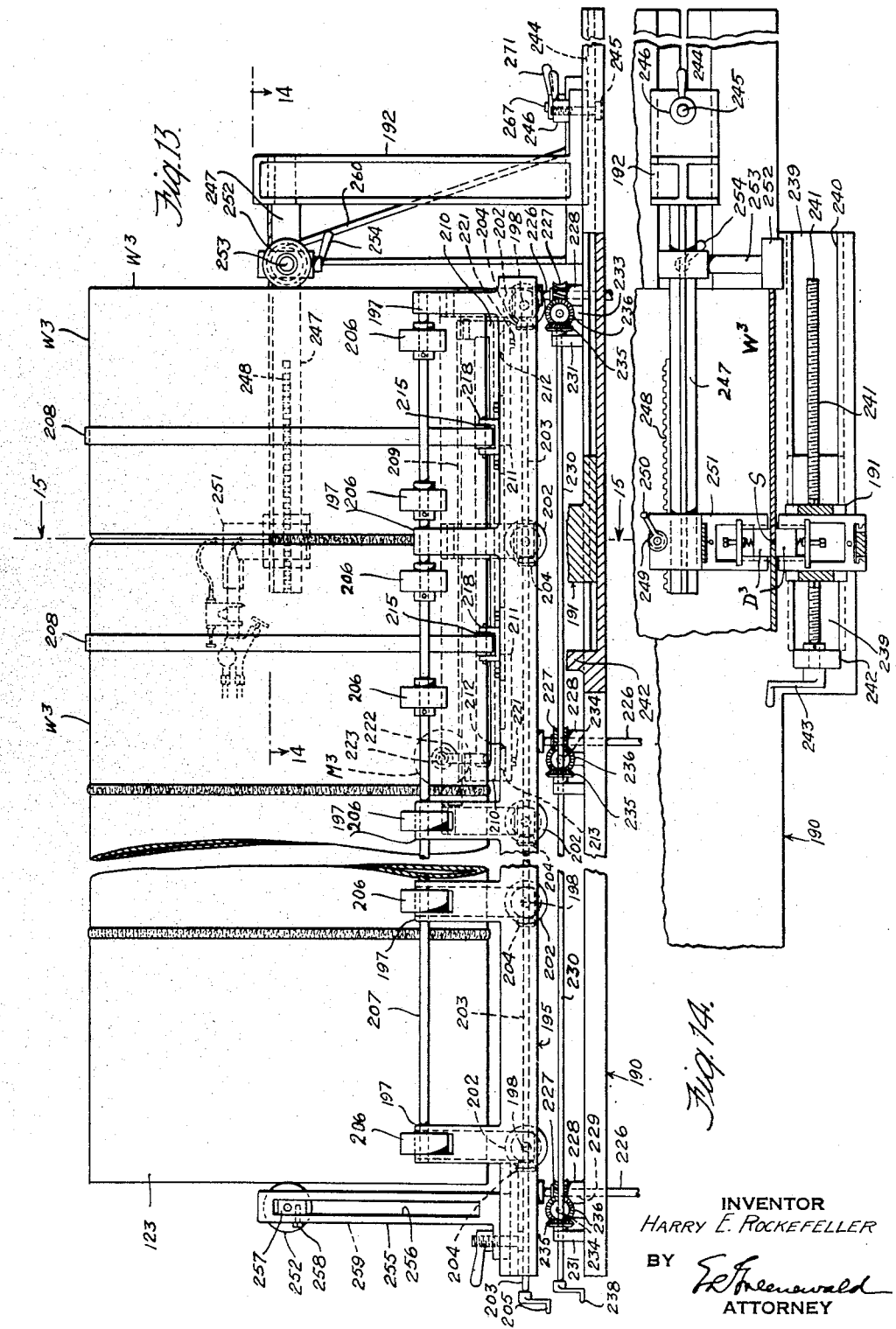

Aug. 10, 1937.　　　H. E. ROCKEFELLER　　　2,089,840
WELDING MACHINE
Filed April 26, 1933　　　7 Sheets-Sheet 7
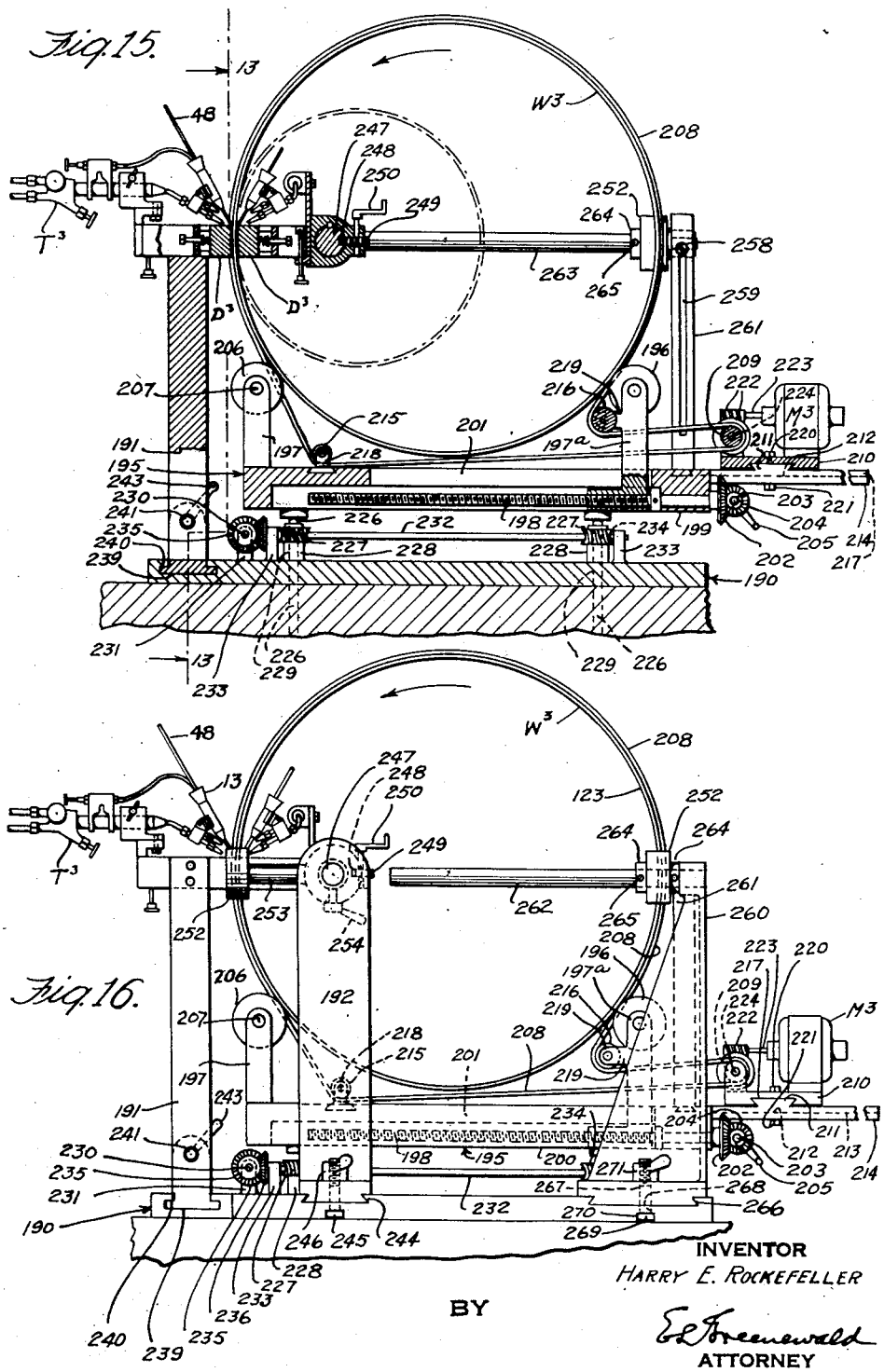
INVENTOR
HARRY E. ROCKEFELLER
BY
ATTORNEY Patented Aug. 10, 1937

2,089,840

UNITED STATES PATENT OFFICE 2,089,840

WELDING MACHINE

Harry E. Rockefeller, New York, N. Y., assignor, by mesne assignments, to Union Carbide and Carbon Corporation, a corporation of New York Application April 26, 1933, Serial No. 667,949

13 Claims. (Cl. 113—59)

This invention relates to the art of welding and particularly to an apparatus for butt welding seams in a vertical position.

Vertical welding is particularly applicable to the welding of thick plates. In this field of welding, as compared to horizontal welding, it has certain advantages in reference to economy and the quality of the weld produced. In reference to economy several of its advantages are derived from the preparation of the edges to be joined in which very little, if any, beveling is required. As a result, less weld metal is required to fill the welding groove and also less fuel gas is required to complete the weld. In reference to the quality of the weld produced as compared to horizontal welding, it is possible to produce a weld having fewer laps throughout its length and a much more perfect weld at the end of the seam. These improvements result from the fact that the average width of the seam is small and vertical welding may be accomplished by carrying a much smaller puddle. This puddle can be retained over the entire area of the weld and thereby avoid the solidification of portions of the weld and building up the weld over these solidified portions thereby causing laps. A better weld is produced at the top of the seam due to the fact that the weld metal can be retained therein in the fluid state. Also, in the vertical welding it is possible to obtain a greater speed due to the fact that the welding can be done simultaneously from both sides of the seam.

The full benefit of the above advantages have been lost in vertical welding as a result of the difficulties of maintaining the weld metal in the seam in the proper condition of fusion and of retaining the puddle in the seam as the length or height of the seam increases and also of synchronizing the welding of the seam from both faces of the seam or sides of the metallic bodies to be united.

It is an important object of this invention, therefore, to provide an improved mechanism whereby metallic bodies may be welded together with increased speed and economy over that obtainable with mechanisms heretofore known; which may be applied to varying work conditions and at any height on the work; which may be utilized with a minimum consumption of heat and welding material and without loss of either; which will require little or no manipulation of the heating means to maintain the welding puddle in proper condition of fusion and may, therefore, be carried out automatically or semi-automatically; which may be continuously utilized without interruptions or loss of time and without any considerable requirements of skill on the part of the operator; and in which the human element is eliminated or greatly diminished.

It is desirable, in utilizing an apparatus of the above character, that the grain structure of the resultant weld should be refined to an extent that the joint may closely approximate that of the base metal in its physical and chemical properties and that the weld should be "normalized" so that the fibre and molecular construction of the weld will be brought into proper orientation within the body thereof.

It is, therefore, a further object of the invention to provide in the apparatus means whereby these desirable results may be obtained.

According to my invention the edges to be joined are first shaped so that a welding groove having a double or single V or straight sides is formed therebetween. The inclination of the sides of the bevel are made in accordance with the thickness of the edges to be joined, and in the case of the thinner plates, a single V may be used in which the welding is performed from the wider face of the groove. The edges to be joined are then arranged in a vertical welding position. In this position the edges are suitably tacked or clamped together so that the edges may be welded. In the case where the weld is conducted from both faces of the seam, oppositely disposed pairs of heating means and weld metal damming means are moved vertically and relatively with respect to and along each face of the seam to be welded. In the case of welding a single V seam, one of the heating means and one of the welding means of each pair may be dispensed with and the other heating and damming means are moved vertically relatively with respect to the seam and on one side of the seam only. Preferably the double V welding groove is formed between the edges with a slight bevel and the welding is conducted from each face of the seam at the same time.

Simultaneously with, or subsequently to, the travel of the heating and damming means along the seam, the weld may be subjected to a refining influence as, for example, by applying high pressure thereto; the pressure being preferably applied after the formation of the weld and before it has been cooled below red heat. The weld may then be "normalized" so that the molecular and fibrous structure thereof will be brought into proper orientation within the body thereof in a suitable manner as by first cooling it below its critical range and then raising it to a temperature above this range; the critical range for steel, being between 1300° and 1500° F. after which the weld may be cooled at normal atmospheric temperature. Heat may be conserved, in the process by reheating before the work has been completely cooled and preferably as soon as it has reached a temperature just sufficiently below the critical range to insure proper normalizing results.

The above and other objects and novel features of this invention will be apparent from the following specifications taken with the accompanying drawings, in which;

Fig. 4 is a horizontal sectional view on line 4—4 of Fig. 2.

Fig. 5 is a view in vertical section on line 5—5 of Fig. 1 showing the manner of securing the welding apparatus to the work;

Fig. 6 is a view showing the wiring diagram for synchronously connecting the motors in circuit;

Fig. 7 is a vertical sectional view on line 7—7 of Fig. 12, showing a form of apparatus in which the work is moved and the welding apparatus remains stationary.

Figure 1:
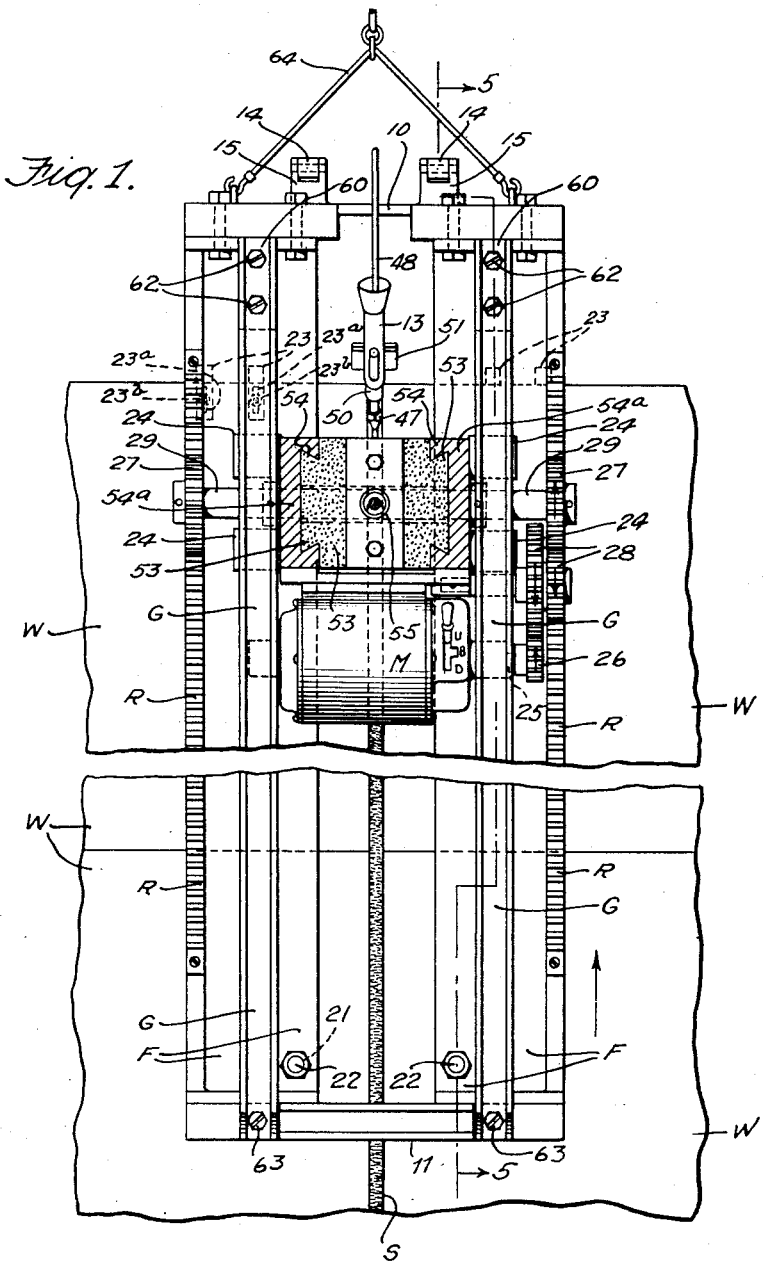
Fig. 1 is a front view partly in section along line 1—1, Fig. 2 of a form of apparatus adapted to be supported by the work in which the welding apparatus is moved vertically along the seam to be welded.

Figs. 8, 9, 10, 11 and 12 are sectional views on lines 8—8, 9—9, 10—10, 11—11, and 12—12 respectively in Fig. 7.

Fig. 10a is a view of a part of the apparatus illustrated in Fig. 7 modified by substituting air hammers for the pressure rolls disclosed in Figs. 7 and 10.

Fig. 13 is an elevational view showing a form of apparatus adapted for carrying out the process of the invention in welding girth seams between the ends of tubular objects; a part being shown in vertical section on line 13—13, Fig. 15, and a part broken away for clarity of illustration.

Fig. 14 is a fragmentary detail view, in section on line 14—14, Fig. 13, showing the relation of the welding apparatus to the work.

Fig. 15 is a view in section on line 15—15, Fig. 13, through the weld and welding apparatus.

Fig. 16 is a view in end elevation viewing the machine from the right of Fig. 13.

The machine illustrated in Figs. 1 to 6 inclusive comprises in its main features two pairs of supporting frame members F; the members of each pair being detachably united at their top and bottom ends by cross braces 10 and 11 and adapted to rest against the work, one on each side of the seam being welded. The pairs of frame members are located on opposite sides of the work preferably in opposition to each other as clearly shown in Fig. 2 so as to position the various elements on each frame in opposition to those of the frame on the opposite side of the work. These frame members are provided with suitable guide members G in the form of ribs connected with base members B of the frames, the guide members having guide slots 12 formed therein to accommodate guide rollers on carriages C and paralleling suitable racks R secured to the frame members, one on each frame member of a pair, as will presently appear.

The welding apparatus of the machine comprises suitable heating means as welding torches T mounted on the carriages C which latter are adapted to be propelled along the guide members G by suitable means, as by motors M, secured to the carriages and preferably suitably synchronized so as to cause the carriages to progress along a seam in unison. The heating units produce a puddle of weld metal within the seam, the heating units acting in cooperation with suitable damming means, as blocks D, in forming the weld; the latter serving to prevent the molten metal of the puddle from flowing out of the seam and being wasted.

The damming means as shown, consist of blocks D of suitable construction for holding the molten metal in the seam and these blocks are supported by the carriages C so as to be moved along the groove in fixed relation to the heating units. There may, also, be provided on the carriages, suitable guide means 13 for directing weld metal preferably in the form of rods to the welding point.

This form of apparatus is particularly adapted for welding vertical seams between objects of considerable size and where large containers of considerable height are to be built in place, such as storage gas tanks. In order to avoid the necessity of having a frame of sufficient length to reach the entire height of such tanks, the frame members F of the present apparatus are designed so that they can be advanced from time to time along the seam S being formed as each section of the work W is completed.

To this end, there are provided at the upper ends of the frame members suitable means for holding the frames to the work, as clamping bolts 14 hinged to supporting brackets 15 on the frame members of the pair on one side of the work and adapted to be swung into notches 16 formed in brackets 17 on the frame members on the other side of the work. Accidental disengagement of the bolts 14 from the notches when the frame members are assembled on work is prevented by engagement of washers 18 loosely carried by the bolts under overhanging ledges 19 on the upper edges of the brackets 17. The washers are maintained on the bolts 14 and underneath the ledge 19 by nuts 20 which serve also for drawing the frame members on opposite sides of the work into snug engagement therewith. The lower ends of the frame members may be connected to the work in any suitable manner. As shown, the frame members are provided with apertures 21 through which bolts 22 are extended connecting pairs of frame members on opposite sides of the work; the apertures in the frame members being, to this end, aligned with apertures formed in the work which are closed by welding after the seam has been completed.

The frame members are also provided at a suitable distance below their upper ends with projecting cleats 23 which are adapted to project across and rest upon the upper edges of the work members so as to properly position the frame members upon the work to provide for travel of the carriage C and the welding apparatus carried thereby to the extreme upper end of the seam to be welded. These cleats may be provided on each frame member in pairs lying on opposite sides of the seam; and the pair on one side is preferably made adjustable in order to adapt the apparatus to work members of different heights being joined. Suitable adjusting means is shown at 23a in the nature of slideway connections between the cleats and frame members; the cleats being adapted to be held in positions of adjustment by set screws 23b operating in slots in the cleats or other suitable means. While the cleats on one side only of the seam are shown as adjustable, obviously, those on the other side may also be made adjustable if desired. In order that the weld may be commenced at the extreme lower end of the seam the frames may be projected a sufficient distance below the work being operated upon to provide for travel of the welding apparatus to position in opposition thereto.

When the frame members are applied to the lowermost tier of work, this tier may be conveniently elevated sufficiently to permit projection of the lower ends of the frame members F to such distance therebelow as may be necessary in order that the weld may be begun at the lowermost end of the seam, the bolts 22 being under these circumstances passed through opposing frame members only. As the weld advances upwardly and additional tiers are added, the bolts will be extended through temporary apertures formed in the last completed tier assuming that the length of the machine frame is suitable for welding the entire length of a seam vertically across a tier.

The carriages C are provided with guide rollers 24 journaled thereto which rest in the guide slots 12 along which they are adapted to travel under the power of motors M one of which is secured to each carriage. Each of the motors M is provided with a shaft 25 to which is secured a gear 26 in driving connection with a traction pinion 27 through speed reducing gears 28. A shaft 29 is journaled in the carriage C, and each end of the shaft carries one of the pinions 27 which are fixed to the shaft 29 and mesh with the teeth of one of the racks R on each frame member F.

The motors M on the opposite sides of the work are synchronized through a suitable electric circuit E (see Fig. 6) including the two motors M and suitable resistances as will presently appear, so arranged that the carriages will be moved along the work in unison and in opposition to each other. The circuit as shown diagrammatically in Fig. 6 of the drawings includes the motors M connected in branch circuits 30 and 31 of a main circuit 32 which is energized by a generator 33. A variable resistance 34 is associated with each of the branch circuits 31 and 32 for individually controlling the speed of one motor in respect to the other by the movement of the contact member 35. A further variable resistance 35a may be provided in the main circuit 32 whereby the speed of the motors may be increased or decreased simultaneously at the will of the operator.

The carriages are provided with arms 36 projecting laterally from the position of the work and adapted to support the torches or blowpipes T adjustably connected therewith through brackets 37. Vertical adjustment of the torches is provided for by having slides 38 slidably connected with the arms 36 by means of vertically extending slideways 39 in the arms which engage in grooves in the sides of the slide members as shown in Fig. 4. Vertical adjustment of the slides is effected through screws 9 journaled to bars 36a which are secured to arms 36 and threaded through lugs 38a on carriages 38.

The torches are mounted on the brackets 37 for adjustment horizontally to and from the work, to which end, the brackets are provided with clamping jaws 40 and 41, the grip of which on the torch may be adjusted through bolts 42 and wing nuts 43. The brackets 37 are connected with the slide members 38 by set screws 44 which have shanks extending through arms 45 on the slides 38 and threaded into the brackets 37. These set screws may be tightened to hold the torches in fixed relation to the work and may be loosened to permit angular manipulation of the torches in a horizontal plane about the set screws as pivots. The torches T may be of the type used for welding.

In order to hasten the welding operation, the torches may be provided with preheating tips 46 in addition to the welding tips 47. The preheating tips 46 are directed upon weld metal or rods 48 being fed into the puddle in the groove in order to give the rod an initial heating before it reaches the welding point. As shown, the welding rods 48 are fed by gravity to the welding region through the rod guides 13. It has been found that a 30° inclination of the rod to the vertical is sufficient to give the proper feed. The rod guides are supported on the carriage and are preferably adjustably secured to the torches T by pivotal connections 49 between interengaging brackets 50, 51 respectively on the torches and guide members. Remote control devices 52, such as are described in detail in Halbing & Kehl Patent No. 1,994,700, are provided for the rods 48 so that said rods may be raised or lowered in the guides at will and without the operator exposing himself to the influence of the high temperature in the welding region.

Preferably the rods 48 are fed to the welding region by gravity and as shown a single welding rod in each guide 13 is used. However other types of rod feeds may be used, such as some of the well known automatically controlled electrical feeds and, if it is desired to accelerate the rate of deposit of the weld metal, two or more welding rods of smaller diameter may be employed for each of the rods shown.

Means have been shown for manually adjusting the torches on the carriage relatively with respect to the welding region in order to initially position the rods and the flames in respect to the seam. After this initial adjustment no further adjustment is usually required during the welding operation which may be carried on automatically.

The dam blocks D may be of any suitable construction, and may be made of refractory material or may be of copper or other high heat conducting material, water cooled to prevent it from becoming overheated. A preferable material for construction of these blocks, however, is a refractory brick containing silicon carbide and sold under the name of "Carbofrax". This material is resistive to erosion and stands the welding temperatures to which it is subjected satisfactorily.

The blocks are mounted in the carriages for sliding movement transversely of the line of travel thereof and so as to be adapted to be pressed firmly against the opposite sides of the work in bridging relation to the seam being welded. A suitable sliding connection between the blocks and the carriage is provided as shown in Fig. 1, comprising laterally projecting dovetailed slides 53 received in similarly shaped slideways 54 formed in the side walls 54a of the arms 36 which house the blocks D.

Figure 2:
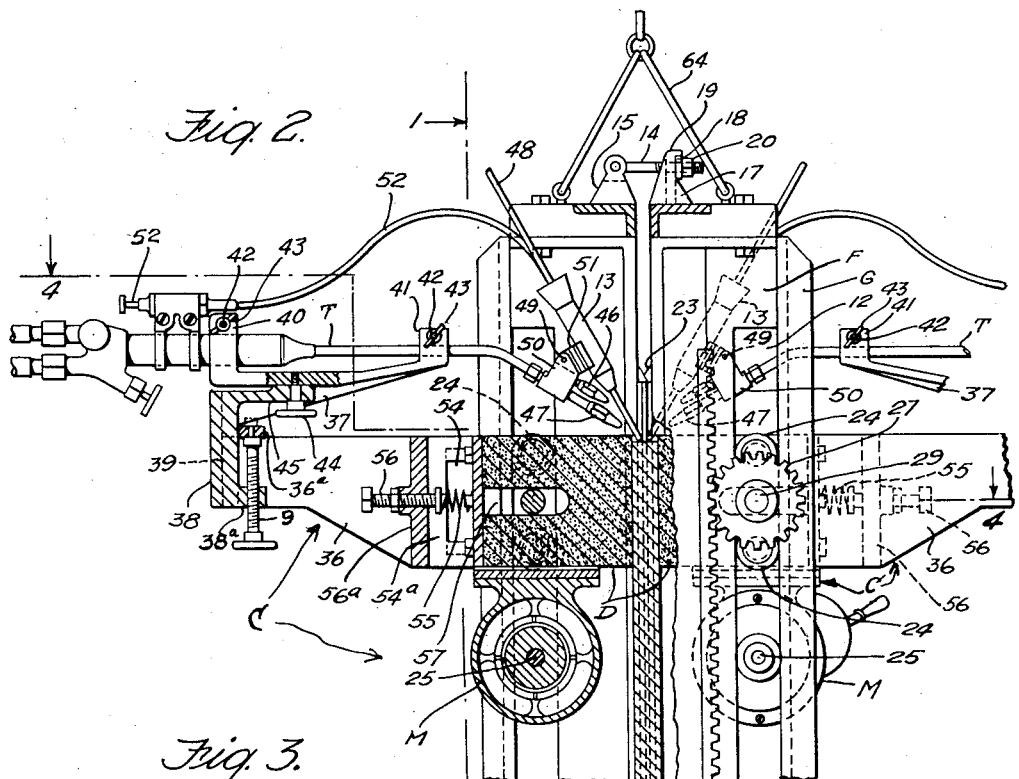
Fig. 2 is a side view of the apparatus showing a portion of the apparatus on one side of the work in section.
Figure 3:
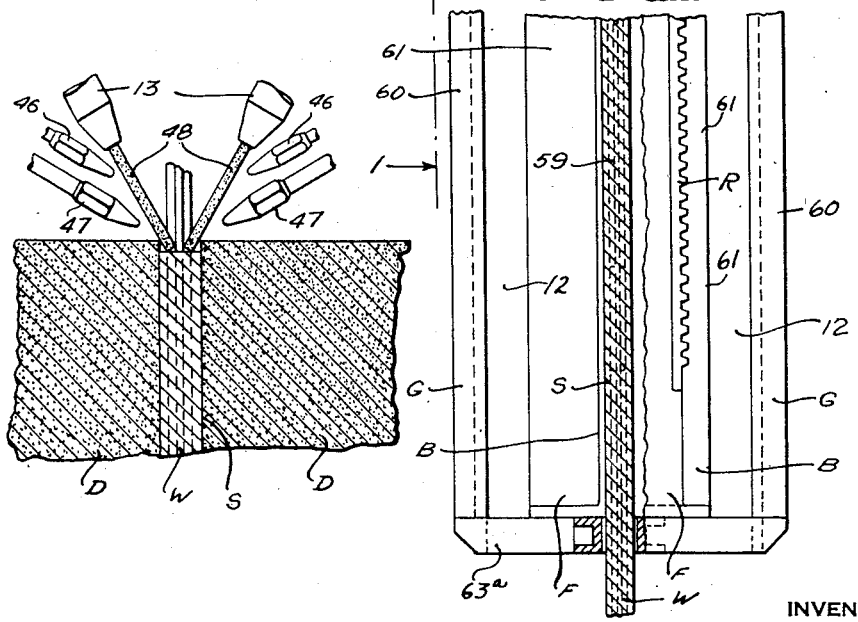
Fig. 3 is an enlarged fragmentary sectional view of the damming blocks showing the relation of the welding tips and rods to the blocks and the work.

The pressure with which the blocks are forced against the work should be sufficient to prevent any appreciable leakage of the welding material from the groove and, to this end, there is provided a yielding pressure on the rear faces of the blocks which may be yieldably exerted through springs 55. The pressure exerted by the springs 55 may be adjusted by screws 56 coacting with the springs and threads in the cross webs 56a which extend between the side walls 54a of each of the arms 36 as shown in Fig. 2. The blocks may be slotted as shown at 57 to accommodate the shaft 29 extending through the side wall 54a of the block housings.

The faces of the blocks contacting with the work may be vertically grooved as shown at 58 in Fig. 4, to provide for formation of a suitable reinforcement 59 of the weld and to accommodate the block thereto when formed. The surfaces of the blocks adapted to press against the work from opposite sides thereof may be of a complementary nature conforming respectively to the opposite surfaces of the objects being welded together, as where the surfaces of such objects are curved. These blocks may also be made interchangeable with other blocks adapted to other surface contours and to this end may be made removable, for which purpose, the guide means G may comprise outer and inner members 60, 61, the outer members being removably connected at the top to the inner members by screws 62 and at the bottom to connections 63a by screws 63. The opposite end of the connections 63a are secured to the base B. When the outer members are removed, carriages C may be disconnected therefrom and the blocks D removed from the slideways 54 and replaced by other blocks.

Suitable hoisting apparatus may be attached to the apparatus through a cable 64 for lifting the parts of the machine into place on the work, and from one locality on the work to another.

In carrying out the process of the invention by means of apparatus of the character shown in Figs. 1 to 6 inclusive, the edges of the work W may be welded together without beveling them but they are preferably given a double V bevel when the edges are thick. The plates are then positioned with the edges in juxtaposed opposition suitably tacked or clamped in position, and the frames of the machines are then lifted into place by means of a hoist attached to the cable 64 and placed on opposite sides of the work with the cleats 23 resting on the upper edge thereof so as to support the machines while they are being clamped together by bolts 14 and 22, the latter extended through openings on the work after the weld between the members of the lower tier of work has been completed. When so attached, the machines bridge the seam and the various units of apparatus on the two machines lie in opposition to each other. The carriages are then moved to the lower ends of the seams and are synchronously advanced upwardly under control of the electric circuit E shown in Fig. 6 and maintained in synchronism by the operator by controlling the resistance in the two branches 30 and 31 of the circuit by moving the contact members 35 over the resistance members 34 as may be necessary to bring the carriages into opposition and the motors into synchronism.

At the start of the weld, the torch is ignited and the sides of the seam and filler material when used, are heated sufficiently to bridge the seam with welding material and the weld is then progressively laid down on top of this foundation until the weld is completed. As the weld progresses upwardly the torches T and dam blocks D are advanced together and should be maintained at a speed to completely form the weld and insure complete penetration in so doing. The pressure on the dam blocks should be so adjusted through screw bolts 56 that they will fit snugly against the work and restrain the molten weld metal from flowing out of the seam and also act as a mold to insure uniform formation of the reinforcement and, on the other hand, so as to avoid such pressure as will place too great a load on the motor and thereby retard the progress of the carriages. The blocks are of sufficient height to insure solidification of the newly formed weld before passing therebeyond and to provide, together with the edges of the seam, a crucible in which the molten metal and heat are confined; the puddle being preferably located at a short distance below the upper edges of the blocks conveniently from ⅛ to ¼ of an inch. The welding material preferably in the form of rods is fed, the while, by gravity or otherwise into the puddles, the lower ends of the rods resting in the puddle and the heat of the torches being directed both onto the lower ends of the rods, the sides of the seam, and the puddle on top of the finished weld.

When the upper end of the seam is reached, a further tier of work may be put in place; the machines attached in place and the weld continued with this and all succeeding tiers in the manner described; the machines being shifted from one locality to the other.

Another form of machine whereby the process of the invention may be carried out is illustrated in Figs. 7 to 12 inclusive and comprises broadly a pair of stationary pedestals P and P' of a character similar to those used with bull riveters arranged in spaced opposition to each other and upon which the torches $T^2$, the dam blocks $D^2$ and other welding apparatus are mounted in fixed position. Associated with the stationary pedestals, there is provided a vertically movable work supporting member Z which may be in the nature of a platform adapted to be raised and lowered in a suitable manner, as by means of lead screws 65 suitably power driven, as by a reversible motor $M^2$ and through suitable power transmitting mechanism as will hereinafter appear. There is provided, in connection with the platform Z work holding clamps, part of which are carried by the platform and the others by an upright column U and an arm A mounted to extend laterally therefrom, both the column and the arm being adjustable as to length, the former vertically to accommodate it to the length and travel of the work and the latter horizontally to accommodate it to work of various shapes and dimensions placed upon the platform, thereby bringing the clamps carried thereon, into proper position to grip the upper edges of the work. This machine is also provided with synchronizing mechanism between the upright column U and the platform Z so that their vertical movements may be effected simultaneously and at the same rate of speed.

In this form of the invention, as clearly indicated above, the welding apparatus is held stationary except for adjustments and manipulatory movements and the work is moved relative thereto. This form of the invention is especially adapted to use in shop work, and elsewhere in the welding of vertical seams in articles that can be conveniently handled manually or by power driven apparatus.

The pedestals P and P' are arranged in opposition to each other upon a suitable base plate 66 located on the ground or other suitable foundation 67, are spaced apart sufficiently to accommodate work of various thicknesses and are provided with pairs of guide rollers 68 for the work arranged in opposition to each other, on the pedestals. These rollers are journaled in supporting yokes 69 adjustable to and from each other by suitable means as adjusting screws 70 threaded through the rear ends of supporting housings 71 for the yokes suitably secured to the pedestals.

The dam blocks $D^2$, torches $T^2$ and welding rod guides may be similar to the corresponding members disclosed in Figs. 1 to 6 and are mounted on the pedestals P and P' in a manner similar to that in which they are mounted on the carriage C in Figs. 1 to 6. As shown in Fig. 9 the blocks $D^2$ are slidably mounted in openings 74 and are yieldably pressed against the work $W^2$ by springs 72, the pressure of which may be adjusted by adjusting screws 73 threaded through plates 73a. The blocks $D^2$ may be removed for replacement or exchanged for others adapted to fit the contour of the surface being welded by either sliding the plate 73a upward through the opening in the arm 36 or by removing the arm 36 by loosening the screws 93 and then sliding the blocks $D^2$ laterally from the pedestals P, P'. The welding torches $T^2$ are adjustably mounted on arms 36 extending from the pedestals laterally of the work position. The torches are each held in a single clamp 75 which are mounted on the arms 36 for horizontal angular adjustment and manipulation by means of a bolt 76 pivotally connecting an arm 77 extending from the clamp with another arm 78 extending from a slide 79. The slides 79 are in the nature of blocks mounted for vertical sliding adjustment upon the arms 36. Vertical adjustment is effected by adjusting screws 80 journaled to the arms 36 at 81 and threaded through lugs 82 on the slides 79. The welding rod guides 83 are angularly adjustable relative to the torches through the pivotal connection 84 therebetween.

In order to refine the grain and crystalline structure of the weld and thereby increase its strength, the weld is hot worked, as by rolling or hammering, and afterwards heat treated.

In the first of the above steps it is preferable to roll or hammer the weld immediately after the weld metal has solidified in order to conserve the residual heat of the weld. To this end, as shown in Figs. 7 and 10, pressure rollers are located just beneath the dam blocks and may be journaled in yoke-like carriages 86 which are slidable through openings 87 extending lengthwise of the pedestals; the yokes being held in position by guide rails 88 mounted in the openings transversely of the pedestals P, P'. The pressure exerted through these rollers may be adjusted through pressure adjusting screws 89 threaded through plates 90 removably secured to the pedestals and one of which may act through the yieldably compressible means as a spring 91.

The rollers preferably have comparatively smooth surfaces conforming in curvature with the surfaces of the work opposite which they operate and the rollers with their related mechanism may be detachably secured to the pedestals so as to be interchangeably used with rollers of other peripheral contour suitable to various contours of work surface. For this reason, plates 90 are provided which are removably secured in place on the pedestals as by screws 92 and, upon disconnection thereof, the yokes 86 and rollers carried thereby may be removed from the openings 87.

In Fig. 10a another means is shown for refining the grain of the weld, which comprises substituting air hammers 85 shown in Fig. 10. Otherwise the modification disclosed in Fig. 10a is the same as that disclosed in Figs. 7 and 10 and the corresponding parts are designated by the same reference numerals.

The heat treatment of the weld comprises reheating the welded seam from a point below the critical normalizing range to or slightly above the critical normalizing range within which the crystalline or grain structure will properly orient itself and relieve the stresses produced incident to the welding and rolling operations.

Suitable heating means for producing the required temperatures may be produced by oxyacetylene torches 94 positioned below the pressure rollers 85 a sufficient distance to insure the cooling of the welded joint below the critical range. Since the point in the line of travel at which the joint will be cooled below this range depends upon the rapidity of travel of the work as well as upon the character of the metal, its thickness and certain other factors, the mountings of the torches 94 are made adjustable so that they may be readily brought to the proper position for the specific work being operated upon as by being mounted on supports 95, adustably secured in guideways 96 depending from the supporting structure for the pressure rollers 85 and may be suitably held in adjusted position, as by set screws 97.

In carrying out the welding automatically by means of this form of machine, the work $W^2$ is moved vertically downward past and between the heating means $T^2$ and other apparatus carried by the two pedestals P, P' which remain stationary. For this purpose there is provided the platform Z, which is mounted on the lead screws 65.

The lead screws are raised and lowered by suitable driving mechanism as rotatable hubs 98 having threaded bores, the threads of which coact with those of the lead screws 65. The hubs have integrally formed thereon, gears 99 through which the hubs are synchronously driven by a gear 100 supported by a shaft 100a journaled in a bearing 100b secured to the base 66. The gear 100 is in driving connection with the motor $M^2$ through a belt 101 trained about pulleys 102 and 103 respectively on the motor shaft 104 and a shaft 105 which may be connected with a second shaft 106 coaxial with the first, by means of a clutch 107, the second shaft being in driving connection with the gear 100 through bevel gears 108. The shaft 106 is arranged in coaxial relation to shaft 105 and is journaled in arms 109 and 109a extending respectively upwardly from the base plate 66 and laterally from the base of the pedestal P'. Similarly shaft 105 is journaled in the end of a supporting arm 110 extending upward from the base plate 66.

The hubs 98 rest on raised bosses 111 formed on the base 66 between which the hubs are washers 112. The bosses are centrally bored at 113 coaxially with the bores of the hubs to permit the lead screws 65 to descend into wells 114 formed in the ground for reception thereof.

The platform Z shown in plan, In Fig. 12, is provided with a plurality of clamps 115, as shown three in number, for clamping the lower ends of work $W^2$ in fixed relation to the platform and adapted to be adjustably connected with the platform in various positions for accommodation of work objects of various shapes and tubular objects of various diameters. The platform is provided, to this end, with a number of groups of slots 116, 117, 118, 119, 120, 121, 122 and 123 through which lugs 124 on the clamps may extend. The lugs are threaded and carry nuts 125 by which the clamps may be fixed in adjusted position. The slots 116 and 117 are adaptable for the positioning of the clamps to accommodate flat work, and the other slots may be used in connection therewith for positioning the clamps for cylindrical tubes and work of configurations other than flat.

The clamps comprise a pair of jaws 126 and 127, the former stationary and the latter movable relatively thereto in order to clamp the work therebetween. Movement of the jaws 127 may be effected by adjusting screws 128 threaded through yokes 129 secured to the jaws 126 by connecting members 130. The opposing surfaces of the clamping jaws are preferably curved as shown in Fig. 12 in order that they may make positive line contacts with the work and grip the same positively therebetween.

The platform Z is cut away to form a recess 131 between the groups of slots 116 and 117 in position and of a size to enable the platform to be raised above or passed down over the pedestals and the apparatus carried thereby. This recess also serves to give an operator access to the interior of a tubular object mounted on the platform.

Similar clamps to those just described may be provided for holding the upper end of the work as shown at 132 (see Figs. 7 and 11). These latter clamps 132 may be adjustably mounted on a spider 133 having three or more arms 134. Each of the clamps 132 is provided with a pair of work holding jaws 135 and 136. The inner jaws 135 are integral with or secured to the slidable carriages 138 each of which are provided with a dovetailed land 140 slidable in a dovetailed groove 139 in each of the spider arms 134.

The spider arms are connected centrally by a hub 141 in which is rotatably mounted a shaft 142 having a beveled gear 143 and a crank arm 144 fast thereon. The bevel gear 143 is in driving connection with three other bevel gears 145 secured to threaded shafts 146 journaled to projections 147 extending from arms 134. The threads of the shaft 146 coact with threads in bores formed in the carriages 138 which are movable thereby lengthwise of arms 134 upon rotation of the crank arm 144; all of the carriages being in this manner adjusted in unison. After the jaws are brought into position on opposite sides of the work $W^2$, the jaws 136 may be adjusted toward the jaws 135 for gripping the upper edge of the work by means of the adjusting screws 148 journaled in shoulders 149 on the jaws 136 and threaded through apertures in similar shoulders 150 on jaws 135.

One of the spider arms 134 is also slidably connected with an arm A which is pivotally secured to an upright column U extending upward from the base plate 66 and the spider may be adjusted as a whole through this connection to various positions relative to the platform and so as to accommodate it to various work contours. This adjustment may be effected through a screw rod 151 journaled to the arm A at 152 and having threaded engagement with the arm 134 at 153. This screw rod is preferably operable from the ground level through a crank 154 mounted on the column U and in driving connection with the screw rod 151 through a worm 155 on the crank shaft 156 journaled to a bracket 157 extending from the column U and a worm wheel 158 keyed to a shaft 159 which is journaled in cross supports 160 secured to the column U. The shaft 159 drives the screw rod 151 through a train of bevel gears 161, 162 and 163. The bevel gear 161 is keyed to the vertical shaft 159 and meshes with the bevel gear 162 journaled on or keyed to the horizontal shaft 164 mounted in the upper end of the column U, and the latter gear meshes with gear 163 keyed to shaft 151.

The shaft 164 serves also as an axis upon which the arm A may be rotated in a vertical plane to raise the spider 133 off the work. Preferably, also, the rotation of the arm A is operable from the ground level through a crank 165 journaled to a bracket 166 on the column U. The crank 165 drives a bevel gear 167 which meshes with a gear 168 keyed to the lower end of a vertical shaft 169. A worm 170, keyed to the upper end of shaft 169, meshes with a worm-wheel 171 mounted on the shaft 164 and having its hub secured to the arm A.

As the work $W^2$ is moved vertically up or down with the platform Z by the elevating mechanism it is necessary that the spider 133 clamped to the work should travel with the work and the column U is therefore made in two telescopic sections 172 and 173; the upper section 173 to which the spider is connected through arm A having sliding dovetail connection with the lower section 172 as clearly shown in Fig. 8 which latter section is stationary and rests on the base plate 66.

To accommodate the driving connection between the cranks 154 and 165 and the screw rod 151 and arm A respectively to the up and down movement of section 173 of the column U, the worm wheel 158 and bevel gear 168 are slidably keyed to the respective shafts 159 and 169 so as to provide relative axial movement but at the same time to prevent relative rotary movement therebetween. Suitable wells 174, 175 are provided in the ground beneath the base plate 66 into which these shafts may be retracted as the upper section 173 of the pedestal is lowered. The shaft 159 is held against axial movement relative to section 173 of the pedestal by suitable means as a collar 176 secured to the shaft 159 and embracing the uppermost cross support 160. Similarly, shaft 169 is prevented from axial movement relative to section 173 by being journaled in a bracket 177 secured to section 173 and embraced by the worm 170 and collar 177a.

Raising and lowering of the section 173 of the column may be accomplished through power from the motor $M^2$ in synchronism with the raising and lowering of the platform Z by the provision of a lead screw 178 journaled in a sleeve 179 secured to the base plate 66 so as to extend in parallelism with the pedestal U. The threads on the lead screw 178 cooperates with a threaded bore in a laterally extending arm 180 secured to the slidable section 173 of the column U. The lead screw 178 is driven from the motor $M^2$ through pulley shaft 105 by means of bevel gears 181, 182, respectively secured to the pulley shaft 105 and a shaft 183, having secured thereto a bevel gear 184 meshing with a bevel gear 185 on a counter shaft 186 which latter is in driving connection with the lead screw 178, through bevel gears 187 and 188. Each end of the shafts 183 and 186 is respectively journaled in supports 183a and 186a extending upwardly from the base plate 66.

In the operation of the modification of the apparatus just described, the platform Z is employed to raise and lower the work W². It is preferable with the clutch engaging shafts 105 and 106 to raise the platform Z and the spider 133 upward until the platform Z is elevated above the welding apparatus. The shafts 105 and 106 are then disengaged by operating the clutch operating lever 189 which stops the movement of the platform Z and allows the spider 133 to be elevated above the platform Z a sufficient distance to permit the placing of the work W² on the platform. In this position the work W² may be placed on the platform and adjusted in position thereon so that the vertical seam is aligned vertically between the torches T² and the weld forming grooves in the dam blocks D², the rollers 85 and the normalizing torches 94. The work W² is then clamped to the platform Z by the proper adjustment of the clamps 115.

The reversible motor M² is then operated in the direction required to bring the spider 133 downward until the proper level is reached for the adjustment of the clamps 132 on the top of the work W². The clamps 132 are then brought into clamping position on the work by operating cranks 144, 154 and 165, and are secured to the work by the clamping screws 148 on the clamps 132. The work now being clamped in position for welding, the lever 189 is operated to engage shafts 105 and 106 in order that the platform Z and the spider 132 may be operated in unison. The reversible motor M² is then started in the direction to bring the platform and the spider downwardly until the bottom of the work reaches the point opposite the torches T² and then the motor M² is stopped. The torches T² and the rods 48 are put into operation in the usual manner and the seam to be welded is bridged with weld metal. Upon forming a puddle between the dam blocks D², the motor M² is again started in the direction to cause the platform and work carried thereby, together with the spider 133 and the related mechanism, to be lowered gradually with the seam passing between the welding torches and other related apparatus. The weld is progressively formed between the dam blocks and edges of the groove which together form a sort of crucible in which the molten metal and heat are confined so as to provide high efficiency at the welding point.

From the welding region the progressively formed weld passes between the pressure rollers 85 by which the reinforcement of the weld metal is rolled down and its structure refined. As the weld passes further downward it is first suitably cooled as under atmospheric influences to below its critical range and is then heated again to above this range by the normalizing heat of torches 94 after which it is again cooled under normal atmospheric conditions.

Upon completing the seam the motor M² is reversed in the direction to again elevate the work and the spider at the same time until the platform Z is elevated above the welding apparatus. In this position the work may be removed by releasing the clamps 132 and 115 and then elevate the arm A by means of the crank 165. Upon removal of the work the apparatus is then in position to begin the operation over again.

The process as carried out by means of this form of machine differs from that disclosed in Figs. 1 to 6 inclusive principally in that the work is the moving member while the apparatus operating thereon remains in fixed position and there is provision for refining and for normalizing the weld. The refining and normalizing mechanism have been omitted from the machines disclosed in Figs. 1 to 6 for the sake of clearness in illustration but it is obvious, in the light of the above disclosure, that this apparatus may be readily incorporated in these machines as well as in the apparatus shown in Figs. 7 to 12 inclusive. It also appears that refining and normalizing operations may be performed manually without provision of pressure means and torches attached to the carriage of the first form of the invention or to the pedestals of the second form.

It is also possible to apply the process of this invention to girth seam welding and a suitable machine for carrying out the process so applied is illustrated in Figs. 13 to 16 inclusive. This machine comprises a base 190 upon which are supported upright pedestals 191 and 192 which support the welding apparatus T³ and dam blocks D³ in welding relation to the seam. The work is supported by a cradle 195 which is adjustable vertically by suitable means as will hereinafter appear for accommodation of various sized tubular members to the welding apparatus. Means are provided for rotating the seam to be welded past the welding apparatus T³ and dam blocks D³, which latter are positioned substantially on a horizontal radius of the tubular member to be welded. Accordingly the work W³ is supported on dollies 196 and 206. The dollies are rotatively supported on the carriage by upright supports 197 and 197ᵃ. The dollies 206 are preferably mounted on a shaft 207 journaled in the stationary supports 197 on the cradle 195. The dollies 196 may be mounted on a common shaft or individually supported in the uprights 197a. In order to adjust the apparatus to accommodate work of various diameters the dollies 196 may be moved towards or away from stationary dollies 206 by means of a crank 205 fixed to shaft 203 journaled on and lengthwise of the cradle bed 200. The lengthwise shaft 203 is provided with a plurality of bevel gears 204 fixed thereto which individually mesh with the bevel gears 203 fixed to the outer end of each of the lead screw shafts 198. The lead screw shafts 198 are journaled in the cradle bed 200 at 199 and it is provided with threads which cooperate with threads in the upright supports 197a which are moved transversely thereby in the slots 201 in the cradle bed.

Any suitable form of drive may be employed to rotate the seam progressively past the welding apparatus. For example the work may be rotated by the rollers 206 which may be driven by a suitable form of driving means connected to the shaft 207. Another form is illustrated in the drawings in which a belt or a pair of belts 208 are employed suitably driven as by a motor M³. In operation, the belts are trained about the work W³ and a pulley 209 which, for purposes of adjusting the belt to objects of different girth, is mounted, together with the motor, on a carriage 210 and the carriage is mounted upon a bar 211 which is provided with transverse keys 212 slidable in a direction transversely of the cradle in keyways 213 formed in supports 214 mounted on the cradle to extend laterally therefrom on the opposite side thereof from the fixed dollies. The belt is also, preferably, trained about idler pulleys 215 and 216, one of which, namely pulley 215, may be connected to the bed of the cradle and the other pulley 216 between arms 219 on certain of the adjustable dolly supports 197a.

The belts 208 are also preferably mounted for adjustment lengthwise of the cradle in order to accommodate them to various lengths of work and, to this end, the carriage 210 may be slidably keyed to the bar 211. Also, pulley 215 may be journaled to a support 218 keyed to the bed of the cradle for sliding lengthwise thereof; and pulleys 209 and 216 may be of a length to take care of all possible axial adjustments of the carriage 210. The carriage 210 and bar 211 may be provided with means for fixing them in adjusted position, as set screws 220 and 221. The motor M³ is in driving connection with the pulleys 209 through a worm drive 222 between motor shaft 223 and a shaft 224 on which the pulley 209 is secured.

The cradle 195 may be raised and lowered in adjusting the position of work thereon to the welding apparatus by providing a plurality of vertically positioned lead screws 226 rotatably secured to the underside of the cradle and passing through threaded openings axially of worm wheels 227 which are mounted on bosses 228, secured to the base 190. Bores 229 are provided through the bosses and base member 190 coaxial with the openings through the worm wheels to permit the guide screws to be retracted below the base when the cradle is being lowered. A drive shaft 230 is journaled lengthwise of the cradle in suitable supports 231 secured to the base 190 and is in driving connection with the worm wheels 227 through shafts 232 extending transversely of the base and journaled in supports 233 on the base. These transverse shafts have driving connection with the worm wheels 227 through worms 234 thereon and in driven connection with shaft 230 through bevel gears 235 and 236 respectively on the drive shaft 230 and transverse shafts 232. At one end of the shaft 230 there is provided a crank arm 238 whereby the cradle elevating mechanism may be manually operated.

The pedestal 191, on which the outside welding apparatus is supported, is adjustable lengthwise of the machine to bring it into position opposite the seam to be welded and suitable means, to this end, are provided which comprises a keyway 239 in the base 190 of the machine in which the lower end of the pedestal is slidably keyed by means of lateral tongues 240. The pedestal is moved lengthwise of the keyway by suitable means, as a lead screw 241, (see Fig. 14) threaded through the pedestal and journaled in a stationary member 242 at one end of the keyway 239; the end of the lead screw being provided with a crank arm 243 for effecting rotation thereof.

Pedestal 192 may be removably secured to the base by a dovetail connection 244 and a bolt 245 and may be adjusted lengthwise of the keyway and fixed in adjusted position by means of this bolt and a nut 246 in cooperation therewith. The welding and damming apparatus for operating on the interior of the tubular work is preferably mounted on an arm 247 extending horizontally from the upper end of pedestal 192 and this arm may be provided with a longitudinally extending rack 248 by means of which, in cooperation with a pinion 249, the welding and damming apparatus may be advanced or retracted lengthwise thereof. The pinion 249 is mounted on a shaft connected to crank arm 250 journaled in a carriage 251 upon which the internal welding and damming apparatus are mounted.

The machine may also be provided with rollers 252 suitably supported on the side of the machine on which the welding apparatus is located and are adapted to press against the ends of the work to prevent axial shifting thereof during the welding operation. One of these rollers may be rotatably mounted on a shaft 253 extending laterally from the arm 247 on which it is keyed for adjustment lengthwise thereof and is adapted to be held in adjusted position by a lock handle 254. A similar roller may be mounted on a pedestal 255 at the other end of the cradle and provision may be made for vertical adjustment of the roller on this pedestal by forming the latter with a vertically extending slot 256 and journaling the roller to a block 257 adapted to be adjusted lengthwise of the slot. The block is held in adjusted position by suitable means, as a set screw 258, the shank of which is slidable in a slot 259 positioned at right angles to slot 256 and parallel thereto. The screw 158 is adapted to be screwed into the block 257 so as to bind it in adjusted position against the side of the slot. Other end rollers 252 are supported by pedestals 260 and 261 on the other side of the machine. These rollers are carried on arms 262 and 263 extending transversely of the machine and are adjustable lengthwise of the arms for accommodating their positions to that of the edge of the work being operated upon. The rollers may be held in adjusted position on these arms by collars 264 and set screws 265 for holding the collars in adjusted position on the arms.

The pedestal 260 is mounted in a slidable keyway 266 in the base 190 and is adjustable along the keyway lengthwise of the machine for bringing the rollers into contact with the end of the work. The pedestal is adapted to be held in adjusted position by a bolt 267 extending through the base of the pedestal and through a slot 268 in the base 190, and having a head 269 resting in a groove 270 in the base. The bolt may be tightened to hold the pedestal in adjusted position by means of a lock handle 271. Pedestals 255 and 261 are similarly mounted on the end of the cradle opposite pedestals 192 and 260 for adjustment lengthwise thereof in a manner similar to pedestals 192 and 260. The worm 263 is vertically adjustable on pedestal 261 in a manner similar to the roller on pedestal 255, and the parts for effecting this adjustment are therefore designated by the same reference characters.

In the operation as carried out by the form of the invention disclosed in Figs. 13 to 16 inclusive, the same principles of vertical welding disclosed in connection with the form of apparatus illustrated by Figs. 7 to 12, is applied to girth seam welding and the apparatus is similar to that employed in that modification except in reference to the manner in which the welding and damming apparatus is mounted and the manner in which the work is moved.

Before mounting the work on the cradle, the pedestals 192 and 260 may be retracted by loosening the nuts on bolts 245 and 269 and sliding the pedestal, as viewed in Figs. 13 to the right, so as to remove the arm 247 and rollers carried by these pedestals from position to obstruct the mounting of the work on the cradle 195. The work may then be rolled or otherwise placed on the cradle, the supports of the adjustable dollies shifted to the left as viewed in Figs. 15 and 16 so as to bring them into contact with the work and raise it off the bed 200 of the cradle sufficiently to permit it to rotate. The pedestals 192 and 260 may then be moved to the left to project the arm 247 into the bore of the work and to bring arm 262 into proximity with the end of the work. The carriages on which the welding apparatus is mounted may then be adjusted lengthwise of the cradle through the lead screw 241 and rack and pinion 248, 249 respectively to bring the welding and related apparatus into opposition to the seam to be welded and to each other. The work may then be vertically adjusted by turning of the crank 238 so as to properly position the same to the torches and dam blocks which latter should be positioned, for the best results, on a horizontal radius of the work. The rollers 252 may then be brought into contact with the ends of the work by adjustment of the pedestals on which they are mounted axially of the machine and of the rollers on the right side of the machine as viewed in Figs. 15 and 16 along the arms 262 and 263 transversely of the cradle. The belts should then be shifted into proper position on the work by shifting of idlers 215 and carriage 210. Then the motor may be started so as to rotate the work in a counterclockwise direction as viewed in Figs. 15 and 16.

Progress of the weld will then be similar to that of the other embodiments of the invention described herein in which the weld progresses in an upward direction. It will be understood that with proper arrangement to suit the conditions of girth seam welding, rollers similar to the rollers shown at 85, Figs. 7 and 10, for refining the weld may be employed with this form of the invention and a normalizing heat may be applied thereto in the same manner as it is applied in the form of the invention shown in these figures. The construction and arrangement of apparatus for this purpose will be readily devised by one skilled in the art having knowledge of the arrangement thereof in the above mentioned showing. Illustration thereof in connection with the machine for use in girth seam welding is therefore omitted for purposes of clearness and simplicity in illustration.

With the process as herein set forth welding of vertical seams may be made with a minimum requirement of skill on the part of the welder and will be substantially automatic as carried out with the above described machines; heat losses will be materially reduced over previously known processes and less filler material will be required because of the better heat application and for other reasons as indicated above; heavier thicknesses of plate may be successfully and economically welded than has been heretofore possible on account of the ability by the present process to carry a large molten puddle and restrain its application and because of the ability to weld with a slighter bevel or with no bevel at all. The progress of the weld is materially increased in speed and is accomplished at reduced cost over other processes of vertical welding heretofore known; and the welding operation is simplified both as to manual and mechanical application and lends itself to automatic or semi-automatic application with assurity of excellence in result because of the wide latitude of heat application possible without danger of upsetting the satisfactory deposit of metal.

It is to be understood that the principles of the invention as herein disclosed may be applied in other embodiments of mechanism than those herein shown and described and that the machines herein disclosed may be adapted for cutting as well as welding by omission of the dam blocks and substituting cutting for welding torches. It is also to be understood that, whereas the above description and drawings disclose oxygas welding apparatus that the principles of the invention may be carried out by any other suitable heating means such as an electric arc or other electric heating means. Also, while the invention is described as applied to vertical welding, certain features thereof are applicable to flat or horizontal welding and to other heat treating processes. It is desired therefore that the invention be considered in its broadest aspects as applying to heat treatment of every character and that the scope of applicant's invention should be limited only by the terms of the appended claims and the prior art.

I claim:

1. An apparatus for welding seams comprising a means for producing a liquid puddle of weld metal in said seam; a damming block located opposite each face of said seam and adapted to retain said liquid weld metal in said seam; and means for moving said heating means and damming blocks along said seam relatively with respect thereto.

2. Mechanism for use in welding a seam between the edges of metallic bodies comprising the combination of means for applying welding heat from both faces of said seam to the edges to form a puddle of molten metal between said edges; opposed weld metal damming means located below said heating means and on each face of said seam for preventing the molten metal from flowing out from between said edges; and means for providing relative movement between the metallic bodies and the heating and damming means in a direction longitudinally of the edges and so as to maintain the heating and damming means at all times in the same relative positions to each other.

3. Mechanism for use in welding a seam between the edges of metallic bodies which comprises, a track attachable to the metallic bodies; a carriage movable along the track; welding and damming means on said carriage and means for effecting movement of the carriage along the track.

4. Mechanism for use in welding seams between the edges of metallic bodies which comprises a pair of tracks adapted to be secured to the metallic bodies on opposite sides thereof; welding and damming apparatus on each track adapted to be moved therealong together; means for moving the apparatus on one side synchronously with that on the other side and for maintaining the apparatus on the two sides in opposition throughout such movement.

5. Mechanism for use in welding seams between the edges of metallic bodies comprising the combination of heating means for applying welding heat to said edges from both faces of said seam to form a puddle of weld metal between said edges and opposed damming means on each face of said seam in substantially fixed relation to said heating means for holding the weld metal formed by the heating means between said edges; and means for moving the edges past said heating and damming means.

6. Mechanism for use in welding seams between the edges of tubular metallic bodies comprising the combination of heating means for applying welding heat to said edges to provide a molten puddle between the edges; damming means for holding the molten metal between the edges, said damming means being maintained in fixed relation to said heating means; and means for rotating the metallic bodies past said heating and damming means.

7. An apparatus for welding a girth seam between metallic bodies comprising a heating means located opposite each face of said seam and on a substantially horizontal radius of said seam; said heating means being adapted to produce a puddle of weld metal in said seam; a damming means bridging each face of said seam below said heating means and adapted to maintain said puddle in said seam; and means for rotating said seam downwardly between said heating and damming means.

8. Mechanism for use in welding a seam between the edges of metallic bodies comprising in combination, means for applying heat at welding temperature to the edges to be united positioned in vertical juxtaposed opposition so as to provide a molten puddle therebetween; dam means positioned to confine the heat and molten metal produced thereby within the seam when the members are so positioned; and means for effecting relative vertical movement between the heating and damming means on the one hand and the metallic members being united on the other.

9. Mechanism for use in providing a vertical weld between the edges of metallic bodies which comprises in combination, means for providing welding heat; means for holding the edges to be united in spaced vertical opposition; means for damming molten metal between the edges; and means for causing relative movement between the bodies and the heating and damming means in a vertical direction.

10. Mechanism for welding a vertical seam between the edges of metallic bodies comprising in combination, a frame attachable to vertically placed members to be united so as to bridge the seam; a carriage movable vertically upon the frame when so attached; and heating means and damming means on said carriage adapted respectively to apply welding heat to the seam and to confine molten welding material therein.

11. Mechanism for welding a vertical seam between the edges of metallic bodies comprising in combination, a frame attachable to vertically placed members to be united so as to bridge the seam; a carriage movable vertically upon the frame when so attached; heating means and damming means on said carriage adapted respectively to apply welding heat to the seam and to confine molten welding material therein; and means moving with the carriage for feeding welding material into the seam.

12. Mechanism for welding a vertical seam between the edges of metallic bodies comprising in combination, a frame attachable to vertically placed members to be united so as to bridge a seam therebetween; a carriage movable vertically upon the frame when so attached; heating means and damming means on said carriage adapted respectively to apply welding heat to the seam and to confine molten welding material therein; and means for exerting a yielding pressure on the damming means.

13. Mechanism for use in uniting the ends of tubular metallic members comprising in combination, means for supporting the members with the ends to be united in juxtaposed opposition; means for simultaneously rotating the sections so positioned; means positioned for applying welding heat to the said edges; and means for damming molten metal within the seam positioned to bridge the edges of the sections on a horizontal radius of the members.

HARRY E. ROCKEFELLER.